No. 12,546. REISSUED OCT. 23, 1906.

G. E. METCALF.

MEANS FOR TRUING GRINDING WHEELS.

APPLICATION FILED OCT. 19, 1903.

Witnesses
Roy D. Tolman.
Penelope Comberbach.

Inventor
George E Metcalf
By Rufus B. Fowler
Attorney

THE NORRIS PETERS CO., WASHINGTON, D. C.

UNITED STATES PATENT OFFICE.

GEORGE E. METCALF, OF WORCESTER, MASSACHUSETTS.

MEANS FOR TRUING GRINDING-WHEELS.

No. 12,546. Specification of Reissued Letters Patent. Reissued Oct. 23, 1906.

Original No. 730,282, dated June 9, 1903. Application for reissue filed October 19, 1903. Serial No. 177,709.

*To all whom it may concern:*

Be it known that I, GEORGE E. METCALF, a citizen of the United States, residing at Worcester, in the county of Worcester and Commonwealth of Massachusetts, have invented a new and useful Means for Truing Grinding-Wheels, of which the following is a specification.

This invention relates to a device designed to true grinding-wheels and to finish said wheels so as to produce grinding-surfaces of varying coarseness.

To these ends the invention consists of means for truing grinding-wheels, whereby a truing-tool comprising a rotating member may be presented to the grinding-wheel with the axis of the rotating member held at varying angles with the axis of the grinding-wheel.

In the prior art tools for truing grinding-wheels have, as far as I am aware, required during their operation a rest upon which the truing-tool was supported when applied to the grinding-wheel. By the employment of a rest, however, it is inconvenient to present a truing-tool to the grinding-wheel with the axis of its rotating member at an oblique angle to the axis of the grinding-wheel.

Figure 2:
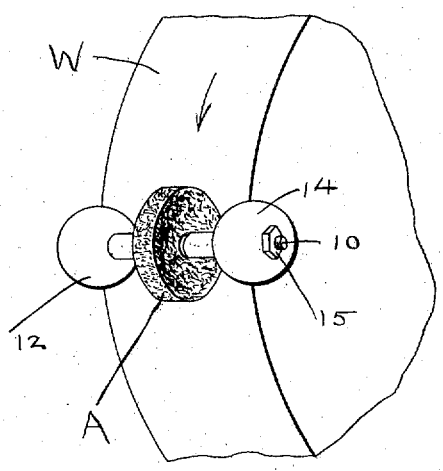
Figure 3:
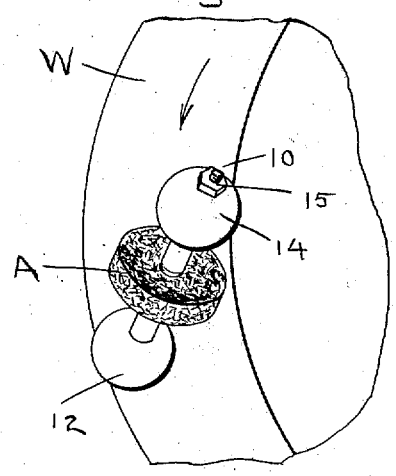

My improvement consists in so constructing a truing-tool comprising a rotating abrading member that a rest is unnecessary. I accomplish this result by first mounting the rotating abrading member, preferably a wheel of corborundum or some similar material, with its axis coincident with the axial line of the handles, which, second, are weighted in order to take up the vibration and impact imparted to the truing-tool by the uneven surface of the rapidly-revolving grinding-wheel, and, third, are adapted to be conveniently grasped by both hands in holding the truing-tool in different positions against the surface of the grinding-wheel, and to this end the handles are made in spherical shape, so that when held in the hands the result of a ball-and-socket joint is obtained, and the truing-tool may be turned and held with its axis in any position desired with reference to the axis of the grinding-wheel, as shown in Figures 2 and 3, without bringing the hands into an uncomfortable or awkward position. By mounting the rotating member of the truing-tool with its axis coincident with the axial line of the handles the revolution of the grinding-wheel tends only to revolve the wheel of the truing-tool, whereas to mount the truing-wheel with its axis out of alinement with the axial line of the handles causes the impact of the revolving grinding-wheel to rotate the handles in the hand, thereby obviating the necessity of a rest. Second, the vibration and motion which in the truing-tools now in use is received by the rest is now counteracted by the weight or inertia of the handles.

To allow the truing-tool to be held with the axis of its rotating member at varying angles with the axis of the grinding-tool, the spherical shape of the handles adapted to rest in the palm of the hand is necessary to permit the handles being easily rocked in and held by the hands of the operator at the desired angle.

Figure 1:
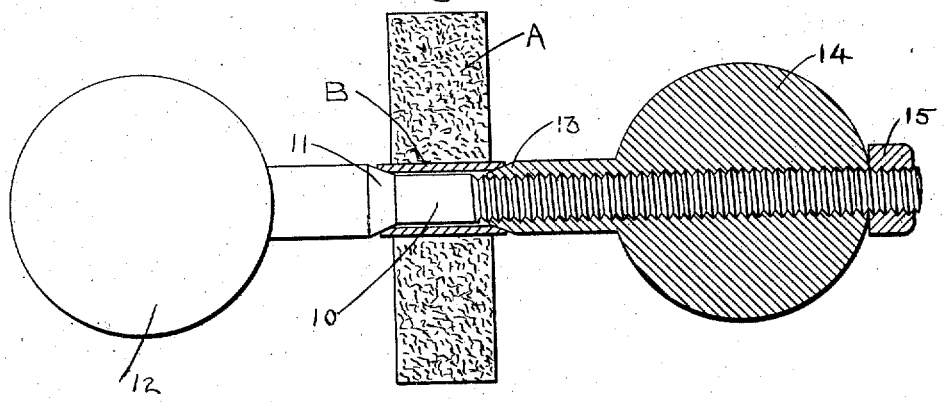
Figure 4:
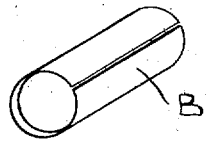

In the accompanying drawings, Fig. 1 is a side view, partly in section, of a device for truing grinding-wheels constructed according to this invention. Fig. 2 is a diagrammatic view illustrating the manner in which a construction for truing grinding-wheels made according to this invention is employed when it is desired to produce a comparatively coarse or rough grinding-surface. Fig. 3 is a view similar to Fig. 2, showing the manner in which the construction is employed when it is desired to produce a fine or relatively smooth grinding-surface; and Fig. 4 is a perspective view of the split tubular bushing upon which the truing-wheel is preferably mounted.

Similar reference letters and figures refer to similar parts in the different views.

A device for truing grinding-wheels constructed according to this invention is especially designed to utilize a property or characteristic of emery-wheels or similar grinding-wheels, by means of which I have discovered that the same wheel may be trued up and finished so as to vary the coarseness of its grinding-surface.

In nearly all the shops or factories where large numbers of grinding-wheels are employed it is now customary to dress or true up the surface of the wheels by turning off more or less of the surface of the wheels by the use of a diamond. A diamond which is sufficiently hard and strong enough to true up emery-wheels is comparatively expensive, and as these truing-diamonds are necessarily mounted loosely in their bearings they are very liable to be lost and have to be frequently renewed.

When an emery-wheel is trued up by the use of a diamond in the ordinary manner, a grinding-surface will be produced which is comparatively fine or smooth.

In attempting to provide a construction which would dispense with the use of diamonds for truing emery-wheels I have discovered a property of such wheels which, so far as I am aware, has never heretofore been recognized and by reason of which I am enabled to dress or resurface emery-wheels to produce substantially any desired degree of coarseness of the grinding-surface—that is to say, I have discovered that when two emery-wheels are brought into engagement with each other with their axes substantially parallel, so that the two wheels will revolve at substantially the same peripheral speed, not only will a smaller wheel act to true up a larger wheel, but the emery particles upon the engaging faces of the wheels interlock or intermesh with each other, so that the wheel which is being dressed off will have a comparatively coarse grinding-surface produced thereon, while, on the other hand, if the axis of the smaller wheel is inclined at a considerable angle to the axis of the larger wheel, to which the same is being applied, the small wheel will be driven or turned at a much slower peripheral speed than the speed of the larger wheel, to which the same is being appli larger wheel, to which the same is being applied, and in practice I have discovered that when a small truing-wheel is employed in this manner the action of the truing-wheel will closely approximate the results produced in truing down an emery-wheel with a diamond—that is to say, it will produce a comparatively fine or smooth grinding-surface on the wheel. By reason of the discovery of this property of emery-wheels, which I believe heretofore never to have been recognized, I am enabled to provide for resurfacing emery-wheels to produce substantially any desired degree of coarseness of the grinding-surface—that is to say, in truing off an emery-wheel to produce a comparatively coarse grinding-surface I employ a small finishing or truing wheel which I set into engagement with the surface of the grinding-wheel, with its axis substantially parallel to the axis thereof, while to produce finer grinding-surfaces the axis of the truing-wheel is inclined, the inclination of the axis of the truing-wheel being increased according to the fineness of grinding-surface which it is desired to produce, so that I am enabled by means of the same truing-tool to true similar grinding-wheels with any required degree of coarseness of grinding-surface. This I do by my construction, which allows the axis of the tool to be held at any angle with the axis of the grinding-wheel, and my invention consists in so constructing the truing-tool that I can so vary the angle of its axis in relation to the axis of the grinding-wheel.

The essential parts of my invention which enable me to accomplish this are by weighting the handle to take up the vibration, mounting the truing-tool with its axis coincident with the axial line of the handles, thereby removing the liability of the grinding-wheel turning the tool in the hands of the operator and obviating the necessity of a rest, and in so shaping the handles that they may be more easily held by the operator in any position of the tool.

In practicing my invention my construction for truing grinding-wheels consists, essentially, of a small truing-wheel (in practice I have used the smaller sizes of worn-out emery-wheels, although I have secured the best results from a hard grade of carborundum) and means for presenting this truing-wheel to the surface of the grinding-wheels at different angles.

The truing-wheel may be mounted in any desired form of framework which will permit its axis to be set to different inclinations. In practice, however, I prefer to mount the truing-wheel upon a stud or axle having steadying weights or balls near its end, which will permit a workman in using the construction to grasp the ends of the axle and hold the wheel up to the surface of a grinding-wheel, the steadying weights or balls permitting the construction to be held steadily, so as to operate without chattering or vibration.

Referring to the accompanying drawings for a detail description of an apparatus constructed according to my invention and of the manner in which the same is employed, as shown in Fig. 1, A designates a small truing-wheel of emery or carborundum. In practice I have used the worn-out emery-wheels of small size, and when such a wheel is employed I preferably mount the wheel A upon a split bushing B, having chamfered ends. The bushing B, with the wheel A thereon, is mounted on a stud or shaft 10 and runs upon cone-bearings. One cone 11 is formed integrally with the shaft 10, and at the end of the shaft 10 is a steadying ball or weight 12. Threaded onto the other end of the shaft 10 is a second steadying ball or weight 14, having a cone 13 for engaging the other end of the bushing B. The tightness of the bearings of the truing-wheel A may be regulated by adjusting the ball 14, and the parts may be held in adjusted position by a lock-nut 15.

In the use of a truing device as thus constructed the relative position of the parts when it is desired to produce a comparatively coarse grinding-surface is shown in Fig. 2—that is to say, if it is desired to produce a coarse surface upon the grinding-wheel W the truing-wheel A is applied to the surface thereof with its axis substantially parallel with the axis of the wheel W. With the parts in the relation shown in Fig. 2 the grinding-wheel W and small truing-wheel A turn at substantially the same peripheral speed, so that the particles of emery will intermesh or interlock with each other, so as to leave a comparatively coarse grinding-surface on the wheel W. When, however, a truing-wheel A has its axis held at a considerable inclination to the axis of the grinding-wheel W, as shown in Fig. 3, the truing-wheel A will be driven at a comparatively slow peripheral speed, producing a smooth grinding-surface on the wheel W, closely approximating the smooth surfaces produced by turning off grinding-wheels with a diamond.

The construction above described may be varied in many particulars without departing from the scope of my invention, and I do not, therefore, limit myself to the particular construction described.

What I claim as my invention, and desire to secure by Letters Patent, is—

1. As an article of manufacture, a resurfacing device for resurfacing emery-wheels comprising a wheel or disk of substantially the same material as the emery-wheels which are to be resurfaced, a metallic bushing for the truing-wheel, a shaft having a conical bearing engaging one side of the bushing, an adjustable bearing-piece threaded onto the shaft and having a conical end for engaging the opposite side of the bushing, metallic balls carried by the shaft and adjustable bearing-piece respectively and a lock-nut for holding the parts in their adjusted position, the balls of said device being adapted to be grasped by the operator.

2. As an article of manufacture, a resurfacing device for resurfacing emery-wheels, comprising a wheel or disk of substantially the same material as the emery-wheels which are to be resurfaced, a metallic bushing for the truing-wheel, a shaft having a bearing engaging one end of said bushing, an adjustable bearing-piece threaded onto the shaft for engaging the opposite end of said bushing, and handles carried by said shaft and said bearing-piece respectively.

3. As an article of manufacture, a resurfacing device for resurfacing emery-wheels, comprising a truing-wheel, a metallic bushing for said truing-wheel, a shaft having a bearing engaging one end of said bushing, an adjustable bearing threaded onto the shaft for engaging the opposite end of said bushing, and handles for supporting said device.

4. In a truing device for truing grinding-wheels, the combination of a pair of weighted handles, a shaft rigidly connecting said handles, an abrading-wheel, a metallic sleeve forming a bushing for said abrading-wheel, a bearing for one end of said sleeve formed on said shaft and a bearing for the opposite end of said sleeve formed on one of said weighted handles.

Signed at Worcester, in the county of Worcester and Commonwealth of Massachusetts, this 5th day of October, 1903.

GEORGE E. METCALF.

Witnesses:

PENELOPE COMBERBACH,
RUFUS B. FOWLER.